United States Patent
Lu et al.

(10) Patent No.: US 9,851,948 B2
(45) Date of Patent: Dec. 26, 2017

(54) METHOD FOR IMPLEMENTING PRECOMPUTATION OF LARGE NUMBER IN EMBEDDED SYSTEM

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 200 days.

(21) Appl. No.: 14/765,423

(22) PCT Filed: Apr. 11, 2014

(86) PCT No.: PCT/CN2014/075172
§ 371 (c)(1),
(2) Date: Aug. 3, 2015

(87) PCT Pub. No.: WO2014/169783
PCT Pub. Date: Oct. 23, 2014

(65) Prior Publication Data
US 2016/0004511 A1    Jan. 7, 2016

(30) Foreign Application Priority Data
Apr. 16, 2013  (CN) .......................... 2013 1 0132081

(51) Int. Cl.
G06F 7/72    (2006.01)
(52) U.S. Cl.
CPC ................ *G06F 7/728* (2013.01); *G06F 7/72* (2013.01)

(58) Field of Classification Search
None
See application file for complete search history.

(56) References Cited

U.S. PATENT DOCUMENTS

| 8,291,223 B2 | 10/2012 | Ohyama | |
|---|---|---|---|
| 2002/0039418 A1* | 4/2002 | Dror | G06F 7/724 380/28 |
| 2003/0031316 A1* | 2/2003 | Langston | G06F 7/72 380/28 |

(Continued)

FOREIGN PATENT DOCUMENTS

| CN | 1967469 A | 5/2007 |
|---|---|---|
| CN | 102571342 A | 7/2012 |
| CN | 103207770 A | 7/2013 |

OTHER PUBLICATIONS

International Search Report (English and Chinese) and Written Opinion (Chinese) for PCT/CN2014/075172/ ISA/CN, dated Jul. 15, 2014.

*Primary Examiner* — David H Malzahn
(74) *Attorney, Agent, or Firm* — Harness, Dickey & Pierce, P.L.C.

(57) ABSTRACT

Disclosed is a method for implementing precomputation of a large number in an embedded system. A modulo module, a modulo adding module, and a Montgomery modular multiplier are invoked according to a data format of a modulus length and a value of each data bit of a binary number corresponding to the modulus length, to perform an iterative operation, so that a precomputation result of a large number can be obtained when the modulus length is an arbitrary value, thereby improving the data processing speed.

15 Claims, 4 Drawing Sheets

(56) References Cited

U.S. PATENT DOCUMENTS

| | | | |
|---|---|---|---|
| 2008/0144810 A1* | 6/2008 | Gopal | G06F 7/723 380/30 |
| 2010/0183145 A1 | 7/2010 | Ohyama | |
| 2016/0004511 A1* | 1/2016 | Lu | G06F 7/728 708/491 |

* cited by examiner

METHOD FOR IMPLEMENTING PRECOMPUTATION OF LARGE NUMBER IN EMBEDDED SYSTEM

This application claims priority to Chinese Patent Application No. 201310132081.6, entitled 'METHOD FOR REALIZING PRECOMPUTATION FOR LARGE NUMBER IN AN EMBEDDED SYSTEM', filed on Apr. 16, 2013 with State Intellectual Property Office of PRC, which is incorporated herein by reference in its entirety.

FIELD

The present disclosure relates to field of information security, more particularly, to a method for realizing pre-computation for a large number in an embedded system.

BACKGROUND

With popularity of network application, network security is becoming more and more important, thus many products for network security come out. Network security products relate to many aspects, such as information privacy and vulnerability defense, which usually use large numbers computation to ensure confidentiality of data.

In the conventional technology, during a process of a large number computation based on Montgomery Modulo Multiplication, pre-computed value can be obtained via subtraction and shifting, but processing speed is tardy.

SUMMARY

The present disclosure provides a method for realizing pre-computation for a large number in an embedded system, which solves the problem that the processing speed is tardy during the process of the large number computation.

An embodiment of the present disclosure provides a method for realizing pre-computation for a large number in an embedded system, including:

SA1, including: reading data in a first register, and writing the data which is read into a first random access memory; reading data in a second register, and writing the data which is read into a second random access memory; where the first register is configured to store a first data, the second register is configured to store a second data, the second data is a power with 2 as its base number and a third data as its exponent, the third data is an integer;

SA2, including: invoking a module for modulo to perform an operation on the data in the first random access memory and the data in the second random access memory, and writing a result which is obtained from the operation into a third register and a fourth register respectively; where the module for modulo is configured to perform modulo operation with the data in the second random access memory mod the data in the first access memory;

SA3, including: reading data in the third register, and writing the data which is read into a third random access memory and a fourth random access memory respectively; reading data in the first register, and writing the data which is read into a fifth random access memory;

SA4, including: invoking an modulo addition module to perform an operation on the data in the third random access memory, the data in the fourth random access memory and the data in the fifth random access memory, and updating the data in the third register with a result which is obtained from the operation; where the modulo addition module is configured to perform modulo addition operation with the data in the third random access memory plus the data in the fourth random access memory to obtain a sum, and the sum mod the data in the fifth random access memory;

SA5, including: reading data at the least significant bit in a sixth register according to data in a fifth register, and making the data which is read as data at current bit, where an initial value of the data in the fifth register is a preset value, the sixth register is configured to store the third data;

SA6, including: determining a value of the data at the current bit, executing step SA7 if the value of the data at the current bit is 0; executing step SA10 if the value of the data at the current bit is 1;

SA7, including: reading data in the third register, and writing the data which is read into a sixth random access memory and a seventh random access memory respectively; reading data in the first register, and writing the data which is read into an eighth random access memory;

SA8, including: invoking a Montgomery modulo multiplier to perform modulo multiplication on the data in the sixth random access memory, the data in the seventh random access memory and the data in the eighth random access memory, and updating the data in the third register with a result which is obtained from the modulo multiplication; where the Montgomery modulo multiplier is configured to perform modulo multiplication on the data in the sixth random access memory, the data in the seventh random access memory and the data in the eighth random access memory as a first input parameter, a second input parameter and a third input parameter respectively;

SA9, including: updating data in the fifth register, and according to the updated data in the fifth register, reading data which is one-bit higher than the data at the current bit from the sixth register, and making the data which is read as updated data at the current bit, and returning to step SA6;

SA10, including: reading data in the fourth register, and updating the data in the sixth random access memory with the read data; reading data in the third register, and updating the data in the seventh random access memory with the read data; reading data in the first register, and updating the data in the eighth random access memory with the read data;

SA11, including: invoking a Montgomery modulo multiplier to perform modulo multiplication on the data in the sixth random access memory, the data in the seventh random access memory and the data in the eighth random access memory, and updating the data in the fourth register with a result which is obtained from the modulo multiplication;

SA12, including: determining whether data at the current bit is data at the most significant bit in the sixth register, executing step SA13 if the data at the current bit is the data at the most significant bit in the sixth register; returning to step SA7 if the data at the current bit is not the data at the most significant bit in the sixth register; and SA13, including: outputting the data in the fourth register.

An embodiment of the present disclosure provides another method for realizing pre-computation for a large number in an embedded system, including:

SB1, including: reading data in a first register, and writing the data which is read into a first random access memory; reading data in a second register, and writing the data which is read into a second random access memory; where the first register is configured to store a first data, the second register is configured to store a second data, the second data is a power with 2 as its base number and a third data as its exponent, the third data is an integer;

SB2, including: invoking a module for modulo to perform an operation on the data in the first random access memory and the data in the second random access memory, and writing a result which is obtained from the operation into a third register and a fourth register respectively; where the module for modulo is configured to perform modulo operation with the data in the second random access memory mod the data in the first access memory;

SB3, including: reading data in the third register, and writing the data which is read into a third random access memory and a fourth random access memory respectively; reading data in the first register, and writing the data which is read into a fifth random access memory;

SB4, including: invoking an modulo addition module to perform an operation on the data in the third random access memory, the data in the fourth random access memory and the data in the fifth random access memory, and updating the data in the third register with a result which is obtained from the operation; where the modulo addition module is configured to perform modulo addition operation with the data in the third random access memory plus the data in the fourth random access memory to obtain a sum, and the sum mod the data in the fifth random access memory;

SB5, including: reading data in the fourth register, and writing the data which is read into a sixth random access memory and a seventh random access memory respectively; reading data in the first register, and writing the data which is read into a eighth random access memory; invoking the Montgomery modulo multiplier to perform modulo multiplication on the data in the sixth random access memory, the data in the seventh random access memory and the data in the eighth random access memory, and updating the data in the fourth register with a result which is obtained from the modulo multiplication; where the Montgomery modulo multiplier is configured to perform modulo multiplication on the data in the sixth random access memory, the data in the seventh random access memory and the data in the eighth random access memory as a first input parameter, a second input parameter and a third input parameter respectively;

reading data at the most significant bit from a sixth register according to data in a fifth register, and making the read data as data at current bit, where an initial value of the data in the fifth register is a preset value, the sixth register is configured to store the third data;

SB6, including: determining a value of the data at the current bit, executing step SB9 if the value is 0; executing step SB7 if the value is 1;

SB7, including: reading data in the fourth register, updating the data in the sixth random access memory with the data which is read; reading data in the third register, and updating the data in the seventh random access memory with the data which is read; reading data in the first register, and updating the data in the eighth random access memory with the data which is read;

SB8, including: invoking a Montgomery modulo multiplier to perform modulo multiplication on the data in the sixth random access memory, the data in the seventh random access memory and the data in the eighth random access memory, and updating the data in the fourth register with a result which is obtained from the modulo multiplication, and executing step SB9;

SB9, including: determining whether the data at the current bit is the data at the least significant bit in the sixth register, executing step SB11 if the data at the current bit is the data at the least significant bit in the sixth register; executing step SB10 if the data at the current bit is not the data at the least significant bit in the sixth register;

SB10, including: reading data in the fourth register, and updating the data in the sixth random access memory and the data in the seventh random access memory with the data which is read respectively; reading data in the first register, updating the data in the eighth random access memory with the data which is read; invoking a Montgomery modulo multiplier to perform modulo multiplication on the data in the sixth random access memory, the data in the seventh random memory and the data in the eighth random access memory, and updating the data in the fourth random access memory with a result which is obtained from the modulo multiplication; where the Montgomery modulo multiplier is configured to perform modulo multiplication on the data in the sixth random access memory, the data in the seventh random access memory and the data in the eighth random access memory as a first input parameter, a second input parameter and a third input parameter respectively;

updating the data in the fifth register, and in accordance with the updated data in the fifth register, reading the data which is one bit lower than the data at the current bit from the sixth register, and making the read data as updated data at the current bit, and returning to step SB6;

SB11, including: outputting the data in the fourth register.

An embodiment of the present disclosure provides another method for realizing pre-computation for a large number in an embedded system, including:

SC1, including: reading data in a first register, and writing the data which is read into a first random access memory; reading data in a second register, and writing the data which is read into a second random access memory;

SC2, including: invoking a module for modulo to perform an operation on the data in the first random access memory and the data in the second random access memory, and writing a result which is obtained from the operation into a third register and a fourth register respectively; where the module for modulo is configured to perform modulo operation with the data in the second random access memory mod the data in the first access memory;

SC3, including: reading data in the third register, and writing the data which is read into a third random access memory and a fourth random access memory respectively; reading data in the first register, and writing the data which is read in to a fifth random access memory;

SC4, including: invoking a modulo addition module to perform an operation on the data in the third random access memory, the data in the fourth random access memory and the data in the fifth random access memory, and updating the data in the third register with a result which is obtained from the operation; where the modulo addition module is configured to perform modulo addition operation with the data in the third random access memory plus the data in the fourth random access memory to obtain a sum, and the sum mod the data in the fifth random access memory;

SC5, including: reading the data in the third register, writing the data which is read into a sixth random access memory and a seventh random access memory respectively; reading the data in the first register, and writing the data which is read into an eighth random access memory;

SC6, including: invoking a Montgomery modulo multiplier to perform modulo multiplication on the data in the sixth random access memory, the data in the seventh random access memory and the data in the eighth random access memory, and updating the data in the third register with a result which is obtained from the modulo multiplication; where the Montgomery modulo multiplier is configured to perform modulo multiplication with the data in the sixth random access memory, the data in the seventh random access memory and the data in the eighth random access memory as a first input parameter, a second input parameter and a third input parameter respectively;

SC7, including: updating data in a fifth register, and determining whether the data in the fifth register is equal to a length of data in a sixth register, executing step SC8 if the data in the fifth register is equal to the length of the data in the sixth register; returning to step SC5 if the data in the fifth register is not equal to the length of the data in the sixth register; and SC8, including: outputting the data in the third register.

An embodiment of the present disclosure provides another method for realizing pre-computation for a large number in an embedded system, including:

SD1, including: reading data in a first register, and writing the data which is read into a first random access memory; reading data in a second register, and writing the data which is read into a second random access memory;

SD2, including: invoking a module for modulo to perform an operation on the data in the first random access memory and the data in the second random access memory, and writing a result which is obtained from the operation into a third register and a fourth register respectively; where the module for modulo is configured to perform modulo operation with the data in the second random access memory mod the data in the first access memory;

SD3, including: reading data in the third register, and writing the data which is read into a third random access memory and a fourth random access memory respectively; reading data in the first register, and writing the data which is read into a fifth random access memory;

SD4, including: invoking an modulo addition module to perform an operation on the data in the third random access memory, the data in the fourth random access memory and the data in the fifth random access memory, and updating the data in the third register with a result which is obtained form the operation; where the modulo addition module is configured to perform modulo addition operation with the data in the third random access memory plus the data in the fourth random access memory to obtain a sum, and the sum mod the data in the fifth random access memory;

SD5, including: reading the data in the third register, and writing the data which is read into a sixth random access memory and a seventh random access memory respectively; reading the data in the first register, and writing the data which is read into an eighth random access memory;

SD6, including: invoking a Montgomery modulo multiplier to perform modulo multiplication on the data in the sixth random access memory, the data in the seventh random access memory and the data in the eighth random access memory, and updating the data in the third register with a result which is obtained form the modulo multiplication; where the Montgomery modulo multiplier is configured to perform modulo multiplication with the data in the sixth random access memory, the data in the seventh random access memory and the data in the eighth random access memory as a first input parameter, a second input parameter and a third input parameter respectively;

SD7, including: determining whether data in a fifth register is equal to a length of data in a sixth register, executing step SD9 if the data in the fifth register is equal to the length of the data in the sixth register; executing step SD8 if the data in the fifth register is not equal to the length of the data in the sixth register;

SD8, including: updating the data in the fifth register, and returning to step SD5; and SD9, including: outputting the data in the third register.

Technical solutions according to embodiments of the present disclosure may improve processing speed of data by using Montgomery modulo multiplier to perform iterative operation on data and to get pre-computation result.

DETAILED DESCRIPTION

The present disclosure is further described with the embodiments and the drawings below to make the technical solutions of the present disclosure more clearly. Nevertheless, the following embodiments are just a few of embodiments of the disclosure. Any other embodiments made by those skilled in the art on the basis of embodiments of the disclosure without creative work fall in the protective scope of the disclosure.

An embodiment provides a method for data processing based on Montgomery modulo multiplication, during the procedure of data processing, CPU (Central Processing Unit) may invoke a module for modulo, an addition module and a Montgomery modulo multiplier. The module for modulo is configured to perform modulo operation, in which data in a second random access memory mod data in a first random access memory. The modulo addition module is configured to perform modulo addition operation on data in a third random access memory, data in a fourth random access memory and data in a fifth random access memory, which is the data in the third access memory plus the data in the fourth random access memory makes a sum, and then the sum mod the data in the fifth random access memory. The Montgomery modulo multiplier is configured to perform modulo multiplication on data in a sixth random access memory, data in a seventh random access memory and data in an eighth random access memory which are regarded as a first input parameter, a second input parameter and a third input parameter respectively.

In the embodiment, a first register is configured to store a first data N, a second register is configured to store a second data $R=2^n$, n is an integer, a third register, a fourth register and a fifth register are configured to store intermediate data during the data processing, a sixth register is configured to store a third data which is a length n.

Figure 1:
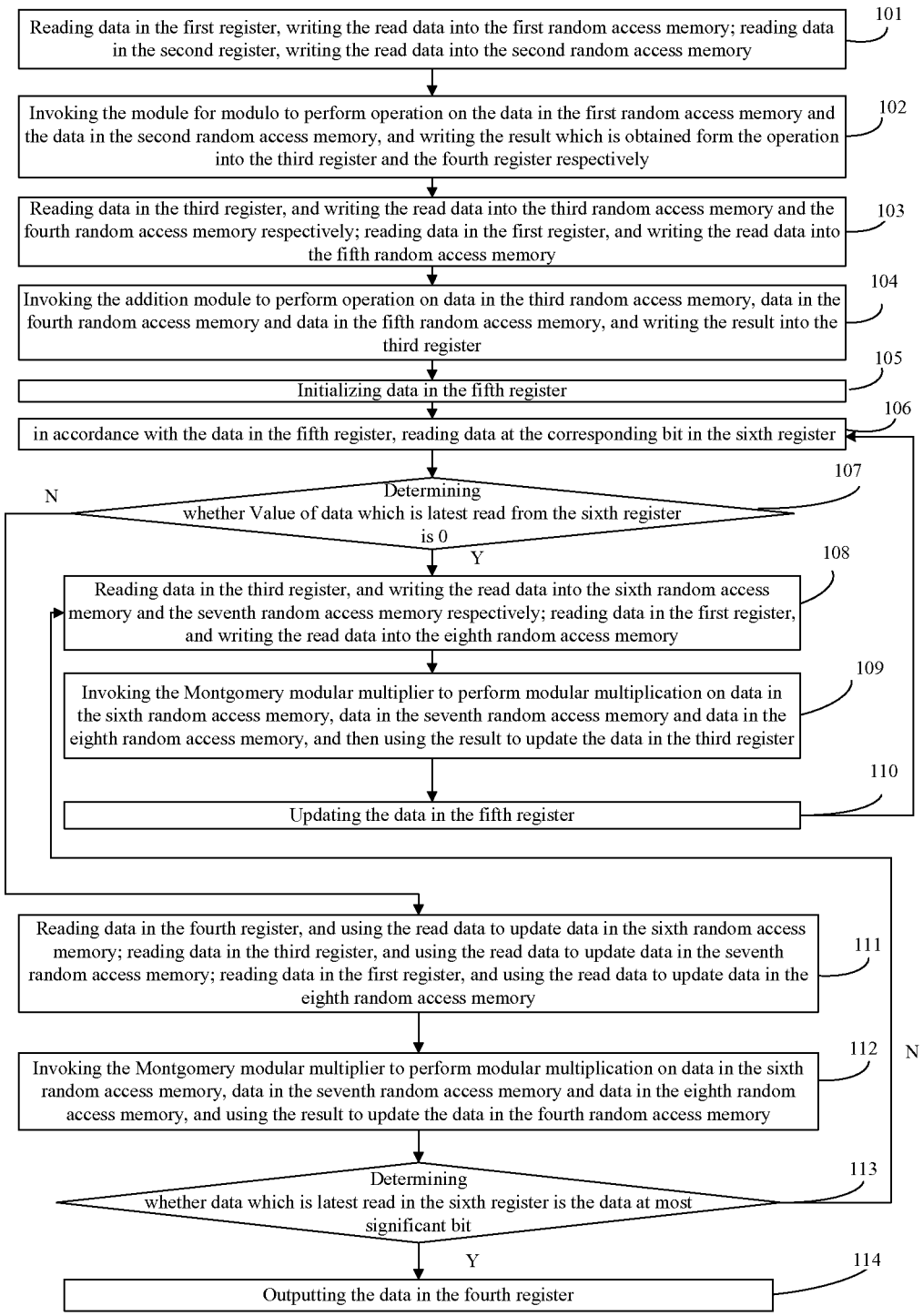
FIG. 1 is a flowchart of a method for realizing pre-computation for a large number in an embedded system according to embodiment 1 of the present disclosure.

FIG. 1 illustrates a flowchart of a method for realizing pre-computation for a large number in an embedded system according to embodiment 1 of the disclosure, including step 101 to step 114.

In step 101, data in a first register is read, and the read data is written into a first random access memory; data in a second register is read, and the data which is read is written into a second random access memory.

In step 102, a module for modulo is invoked to perform an operation on the data in the first random access memory and the data in the second random access memory, and a result which is obtained from the operation is written into a third register and a fourth register respectively.

In the embodiment, after the module for modulo is invoked to perform the operation, data in the third register is recorded as W, data in the fourth register is recorded as S, and S is equal to W and equal to R mod N. For instance, N is
0xD99E413375024660171E3AB08CA00A3E1AA4985B
EAAF8AC09F892DA9C61915945C7B4D72849EC1CD74
7586AB780D0B171FD8C27A5688A2E085AF6C50687A
E3E0997238134D7DA34B96B8B7C0C993B4F1DF3FF6
D46826460E13B0E8FAFA0BD59B2843627A4B8B253C
5873FA87720D28DC3021A1898CF7DE8B4BC7525086
CBFFE7CD1176663EC8EE958D59C94D60010E2F6063
D5108049931454D00985B478064C2607DEB977D973C7
750A19B2BC65DA102DD0A371, and
R is
0x10000000000000000000000000000000000000000
00000000000000000000000000000000000000000
00000000000000000000000000000000000000000
00000000000000000000000000000000000000000
00000000000000000000000000000000000000000
00000000000000000000000000000000000000000
00000000000000000000000000000000000000000
0000000000000000000000000.

A value of W and a value of S both are
0x2661BECC8AFDB99FE8E1C54F735FF5C1E55B67A4
1550753F6076D25639E6EA6BA384B28D7B613E328B
8A795487F2F4E8E0273D85A9775D1F7A5093AF97851C
1F668DC7ECB2825CB46947483F366C4B0E20C0092B
97D9B9F1EC4F170505F42A64D7BC9D85B474DAC3A7
8CO5788DF2D723CFDE5E7673082174B438ADAF7934
001832EE8999C137116A72A636B29FFEF1D09F9C2A
EF7FB66CEBAB2FF67A4B87F9B3D9F8214688268C38
8AF5E64D439A25EFD22F5C8F.

In step 103, the data in the third register is read, and the read data is written into a third random access memory and a fourth random access memory respectively; reading the data in the first register, and the read data is written into a fifth random access memory.

In step 104, the modulo addition module is invoked to perform an operation on the data in the third random access memory, the data in the fourth random access memory and the data in the fifth random access memory, and a result which is obtained from the operation is written into the third register.

In the embodiment, after the modulo addition module is invoked to perform the operation, the result (R mod N)+(R mod N) mod N=2R mod N may be obtained, the data W in the third register may be updated with 2R mod N. For instance, after being updated, the value of W in the third register is
0x4CC37D9915FB733FD1C38A9EE6BFEB83AB6CF482
AA0EA7EC0EDA4AC73CDD4D74709651AF6C27C651
714F2A90FE5E9D1C04E7B0B52EEBA3EF4A1275F2F0
A383ECD1B8FD96504B968D28E907E6CD8961C41801
2572FB373E3D89E2E0A0BE854C9AF793B0B68E9B58
74F180AF11BE5AE479FBCBCECE61042E968715B5EF
268003065DD1333826E22D4E54C6D653FFDE3A13F385
5DEFF6CD9D7565FECF4970FF367B3F0428D104D187
115EBCC9A87344BDFA45EB91E.

In step 105, data in a fifth register is initialized.

Preferably, in the embodiment, the data in the fifth register may be set as 1.

In step 106, in accordance with the data in the fifth register, data at the corresponding bit in a sixth register is read.

A position where the data is to be read in the sixth register is determined according to the value of the data in the fifth register, and the data at the corresponding bit in the sixth register is read according to the position.

Preferably, in the embodiment, an order of the bits of the data which may need to be read in the sixth register may be obtained according to the data in the fifth register, and data of 1 bit is read from the sixth register in accordance with the order of the bits. The order of the bits is a serial number of position of the data at each bit in the sixth register; for instance, when data, in the sixth register, is n, and $n=n_k*2^k+n_{k-1}*2^{k-1}+\ldots+n_i*2^i+\ldots+n_1*2^1+n_0*2^0$ ($n_i=1$ or 0), the data is $(n_k n_{k-1} \ldots n_i \ldots n_1 n_0)_2$ in a case that being converted into the binary system, the bit orders of $n_k$, $n_{k-1}$, $n_i$, $n_1$ and $n_0$ is k, k−1, i, 1 and 0 respectively. In the case that the data in the fifth register is 1, according to the data in the fifth register, the data which is read at the corresponding bit is data $n_0$ at the least significant bit. In the case that the data in the fifth register is k+1, according to it, the data which is read at the corresponding bit is data $n_k$ at the most significant bit.

In the embodiment, in the case that the value of data n in the sixth register may be 1440, whose binary format is $(101\ 1010\ 0000)_2$, after initialization, in the case that the data in the fifth register is 1, the data which is first read is 0 at least significant bit.

In step 107, whether a value of data which is latest read from the sixth register is 0 is determined, step 108 is executed if the value of the data which is latest read from the sixth register is 0; step 111 is executed if the value of data which is latest read from the sixth register is not 0.

In step 108, the data in the third register is read, and the data which is read is written into a sixth random access memory and a seventh random access memory respectively; the data in the first register is read, and the data is written into an eighth random access memory.

In step 109, the Montgomery modulo multiplier is invoked to perform modulo multiplication on the data in the sixth random access memory, the data in the seventh random access memory and the data in the eighth random access memory, and then the data in the third register is updated with a result of the modulo multiplication.

In the embodiment, the data W in the third register, the data W in the third register and the data N in the first register are respectively set as three input parameters of the Montgomery modulo multiplier, and modulo multiplication is performed on them to obtain MontMul (W, W, N)=W*W*$R^{-1}$ mod N, the data W in the third register is updated with W*W*$R^{-1}$ mod N.

For instance, in the case that the data which is read is $n_0$, data W in the third register is updated with
0x9986FB322BF6E67FA387153DCD7FD707956D9E9055
41D4FD81DB4958E79BA9AE8E12CA35ED84F8CA2E
29E5521FCBD3A3809CF616A5DD747DE9424EBE5E14
707D9A371FB2CA0972D1A51D20FCD9B12C38830024
AE5F66E7C7B13C5C1417D0A9935EF27616D1D36B0E
9E3015E237CB5C8F3F7979D9CC2085D2D0E2B6BDE4
D00060CBBA266704DC45A9CA98DACA7FFBC7427E
70ABBDFED9B3AEACBFD9E92E1FE6CF67E0851A20
9A30E22BD799350E6897BF48BD723C.

In the case that the data which is read is $n_1$, data W in the third register is updated with
0xB2DF6A61C5D70D3E5FDFDF961CBF47A2206D4989
7FA83E74C85ACA10123C7B917F548DF2ACD65F8DCF
BC87F18F15385FC2C25365EA648C3699AA6258A75B
FA3535F80EA48D2A84AF67031471D39D46FE4D80A5
10AD4F13029D8F9E5A6B2AFB172B431366B03761C1
C7D86279FB1320849DA2A45416925A34ABFC365685
A801B394C5ACCF95DF397C0FAFD88F3FED00AB38

FB04D6FAD3A892095F54994F8F8EA5537256F592B5
DBF9C54A316EC0D6AADCC754820E.

In the case that the data which is read is $n_2$, data W in the third register is updated with
0x20ED567F6C534104D174FE6AA7D3F4FAAC78DBED
0F99DB846BB54F621481A08F4305F05A1156216E11D0
A863D8A9F5CF8E23562841587E02D0BDA575278210
EB94B4114DE347001FC8CFF252FD543F9C81CAC841
8AFFA172D8FE10E80015D891A8C536352D65380BFF
A26EBEE686F51B68751145408F5637E6A4375182241C
73E277C9C82DBF7A28CD6E50061EC2524BAA9E7B99
297E11184764CDCACEE0987748BF1FEE1552DE7B63
1FC8D87C3E9AFA21AFD423.

In the case that the data which is read is $n_3$, data W in the third register is updated with
0x9FD8D1C8F4EA928E0681B472F4337574846D4F6A
C3CCEBD406F29AE119E75B3D4BA2DB11A690A992
87366664D8062A1F69294A188035D57CE59B6137FFD3
183DED1CFB05C659E29070870C5F6852C09AA7499E
0389F30CC2110E52BEF816DCA0CB3597062E90850A
81378ECB99010AB950134AD5A28B2F3964A1198E21
D4777A073235006DA6BE9A72FC24A2822A30A24FA9
F8B673254342CDEC60F616C787FB19F4DE8D88974B
C7C04907F4477C9BBAE2DBE03A.

In the case that the data which is read is $n_4$, data W in the third register is updated with
0x19B89EFA54C8B5C69A2B02086FAE826F65194FDC
D7132643A1FCA3CB32697FECB16086B2E50C13A98A
E7A929E577FEDEDCCF0FE21C89A6A954D2B7F4C418
15A71B6168B097BC8CE38236A6C267F3F5E3EC3FE9
2ADFD0FECBA2BD8EA8674C81948812864F6242BBE6
EE4857F4EC340420B6E44FA5A61C6789C351C7B16393
CD8B5F5EB78CBB8B4D56AF4BD2A3AA2CF706E458
024A386020D849D7870656AAEF0D9AAEA154EC42C0
8B0AB00426739C7C94DE0CA196.

In the case that the data which is read is $n_5$, data W in the third register is updated with
0x737AD2CCAEA97D279F22DE4C575118ECBF39F9E4
1F1BDA8C740677C14A8FBAA19CBB5DA2125FB13B
BD3815EB7DA6D6454A4716A0E71BF59F578DE15980
9F82EF52AA42DD0452155DF6AE438506C7C7B0C289
21EA7CE4EB5BD6C88362FF45F9DF3999B591A03AEC
9B305B0753E40AC3928973836BF12119DA294FF815EA
F2F8ACFB2B436AFA9BED27EF69C68AB81A059BC7
BD678A82BCD2CEF9DFF577CC8F33E1B9822B8E3F
0D5804A225A44B1EE53CB6EEF93848.

In the case that the data which is read is $n_6$, data W in the third register is updated with
0xD33D4904E41AC66FB543E22D002A68946486D522
E59CCD6C1C59A81ED619FA6D095A98DDC04A47B4
2576D3C91DA81498F59B59CBB1753C7603979261A3
3A7208167F0F1CEA375139E8DD99D04F2423E4A6EE
10F39AE347A0AEB5444625AD2574545E236EEA5174
DEBF82EFF3DC5405971FC1212EC726E49B2BE7CE6A
F543ACD508872EA4DC5B38A2C2742E4AA80A7A9D
63B190D39B3C095753D1EBE8725A9B711437D93B58
5539FB3948163775F8C15EAD65C935.

In the case that the data which is read is $n_7$, data W in the third register is updated with
0x1AD2EA8F41E8E7D6C06D04317F406C438950CF08
918357FFB4BA6C14372740E319D5FB082ECDD03D74
1FF45168AA01EA8112D1F1BE57EDE660D1DD510D1B
1E9F4C4355D690F864BC2644247AD1E254EF85C106
ED14FAC18327BB8DD7441D0FB68D5F1B0E761988D7
2C87843803896D0B76A5EB674C9D4384BDA7686171
3AE8962AD204631EC1ABA0843F66E49E6D2EFE5D
BA80A95DF371990BF14A86DC5AD5F67125B9696DF6
01E04DE091214B5F82F5B47457EF.

In the case that the data which is read is $n_8$, data W in the third register is updated with
0x4AF096BF06BE71B157C1B12A7A39EC6FD9DDBB
C4E8B8C5FA317562B31DFB0FED8C71B4D37D5F9F00
0FCC0BFDD49CBA1591D619F615098ED7D5788662AE
EA2443CE8F3ABD8B766E928D9CF9F0D0E94AA0B7
D179DFF1715AA215B400150F331BA33514DF597D67
7D8490E0E0C73219E0907600EB08A876A0F49AAB3B
14E2F728C54192A8480B216EC1BCE54B5DADFC1581
AC04FCB87ABFFDB1E854511242AB801366BFE0C01C
5639878D658BDE44CC6237DB4330BD.

In the case that the data which is read is $n_9$, data W in the third register is updated with
0x956CB88B112F1DCB30309A00C50A3098B51AABC4
8B94E89DDF0F8582DCB07371D7194494E08EA453A5
28616950ABB1B65176956399E6FBC74BD334812D9D
A3D3B5B229BCD643307D7E52DADC3E64C61874EB
307BD62CB6A77E4AA893A2FCF9A64759D9B88E6E67
6511AC5101F1F358231652B00D78AA05AA0AFB71F1
61AA89CF0DEAE77CCD412441620B35E3D3D3728C
AA84368ACDF33538BE766BAFA60F6CD40C867FB024
363D1489B87D604936EEB7D44034F5.

In the case that the data which is read is $n_{10}$, data W in the third register is updated with
0xCDE0AC6F912257FF9A51B338A27E951CBE0A5B3A
790CA56E2488CED7EDCA526900012803FCC3A6EBF9
819D5490F2438DC50DB41B48B19C2DE714895E885333
4269ED374748BB9EE99B81FB6A7CC97B64BD1CDB14
AA48C1677BB46D7C06770FA8608E0D74984DE085CE
5CF0ADDB3EE4271D8E93D9949D553E34456CA8A9E4
1DA95744EB840A81498E081193048734C370CDECEC
BE976FE7A9622B40E805A7881184C2F7FE85357CA13F
B01C2EB1A7159ED229CC99.

In step 110, updating the data in the fifth register, and returning to step 106.

A result obtained by the data in the fifth register plus a preset step which may be 1 is made as updated data in the fifth register.

In step 111, the data in a fourth register is read, and the data in the sixth random access memory is updated with the data which is read; the data in the third register is read, and the data in the seventh random access memory is updated with the data which is read; the data in the first register is read, and the data in the eighth random access memory is updated with the data which is read.

In step 112, the Montgomery modulo multiplier is invoked to perform modulo multiplication on the data in the sixth random access memory, the data in the seventh random access memory and the data in the eighth random access memory, and the data in the fourth random access memory is updated with a result which is obtained from the modulo multiplication.

In the embodiment, data S in the fourth register, data W in the third register and data N in the first register are respectively set as three input parameters of the Montgomery modulo multiplier, and modulo multiplication is performed on the data to obtain MontMul (S, W, N)=$S*W*R^{-1}$ mod N, and after the result is stored into the fourth register, data S in the fourth register is updated with $S*W*R^{-1}$ mod N.

In the case that the data which is read is $n_5$, a value of which is 1, data in the fourth register is updated with
0x19B89EFA54C8B5C69A2B02086FAE826F65194FDC
D7132643A1FCA3CB32697FECB16086B2E50C13A98A
E7A929E577FEDEDCCF0FE21C89A6A954D2B7F4C418

15A71B6168B097BC8CE38236A6C267F3F5E3EC3FE9
2ADFD0FECBA2BD8EA8674C81948812864F6242BBE6
EE4857F4EC340420B6E44FA5A61C6789C351C7B16393
CD8B5F5EB78CBB8B4D56AF4BD2A3AA2CF706E458
024A386020D849D7870656AAEF0D9AAEA154EC42C0
8B0AB00426739C7C94DE0CA196.

In the case that the data which is read is $n_7$, a value of which is 1, data in the fourth register is updated with
0xCDA46337DD938E5CBBE5BD34A433D49223AEDC
489354AEA5961317A372FF02A2DE00FC155C91FD46
29CECF48ABA3E6B5FB6E47D192931C41F5D22579A1
87F99061FBA714BE6C8BF44B6E2F4DA3F9D549B7CD
638227182DE2D309405178EC7DD8DE2C05EAD5F073
636C11A56FD0A7E6FC77847B4090EF0F13EE529A47
CB9003EC4D96796ABAB10F9E9EE64D02EF6B8ED4
6DB07E0C32A6D398DB4126A61A592E7DDE02215134
E7AE35902F525D3A96C5B45CEDEAA4.

In the case that the data which is read is $n_8$, a value of which 1, data in the fourth register is updated with
0xBCA266809D0887DFDD16887E3D061AFD601DED19
8DE11BA3196241D5C647615002B30D1FA2AC61D8EE
8A2493ABD4D0D8C48D6255F7CC043070E385A4DA
0D1A0EC746A9BA501D403162D185AD4A69C619B60B
217060A9B23F41296DF95852A4373DD5D71D7FCCF7
DD9E3F26432F41CF6CA2D726EF5B49C63FF57D535C
58BB42D87BB258E6804FF5730CF3D71276305A063035
9656CB5DA6E5A095A45F00F724B6B181C37A9830E4
56947B3AC5F249D4D723D6E34D.

In the case that the data which is read is $n_{10}$, a value of which is 1, data in the fourth register is updated with
0xB83C9F28C1E3054ABC74607F8D0E9BF7749570117F
35B79B891169D963F693E928F26FC3422F7EB469E436
0872C2C1122A27EA331D8EA13B559CF48F5F60573F
DCAAAA8F83103CD6A5FF4E6AB3B6F6A4C2C073CE
BC2E12EEC89CF8FB0CD4EF713C354FE5C3D7E60E
5D2DA4D7C82D181B4B1DEF3DE585A616398CACE9
90EBDAF23C441DD72D89D1A295163B6337F5AFB59F
A35E77FA7EDF391F257220D0D5BB61395D26826690
AD1297D714B5D114A2CBD0A814E7.

In step 113, whether the data which is latest read in the sixth register is the data at most significant bit in the sixth register is determined, step 114 is executed if the data which is latest read in the sixth register is the data at most significant bit in the sixth register; step 108 is returned to if the data which is latest read in the sixth register is not the data at most significant bit in the sixth register.

It's may determined that whether a value of the data in the fifth register is equal to a length of the data in the sixth register, the data which is read is the data at most significant bit in the sixth register if the value of the data in the fifth register is equal to the length of the data in the sixth register; the data is not the data at most significant bit in the sixth register if the value of the data in the fifth register is not equal to the length of the data in the sixth register.

In step 114, the data in the fourth register is output.

In the embodiment, the output result is
0xB83C9F28C1E3054ABC74607F8D0E9BF7749570117F
35B79B891169D963F693E928F26FC3422F7EB469E436
0872C2C1122A27EA331D8EA13B559CF48F5F60573F
DCAAAA8F83103CD6A5FF4E6AB3B6F6A4C2C073CE
BC2E12EEC89CF8FB0CD4EF713C354FE5C3D7E60E
5D2DA4D7C82D181B4B1DEF3DE585A616398CACE9
90EBDAF23C441DD72D89D1A295163B6337F5AFB59F
A35E77FA7EDF391F257220D0D5BB61395D26826690
AD1297D714B5D114A2CBD0A814E7.

In the case that the length is any value, by applying the technical solution of the disclosure, the result of pre-computation for a large number may be obtained via performing iterative operation by the Montgomery modulo multiplier according to the value at each bit of binary numbers which is corresponding to length, thereby the speed of data processing is improved.

It's important to note that in other embodiments of the disclosure, the data in the fifth register may be initialized as any value beside 1, and the value is corresponding to the position of the data at the least significant bit in the sixth register; when being updated, the data in the fifth register may be increased any value beside 1, and then the data in the sixth register is read in accordance with the updated data in the fifth register, the read data in the sixth register is one-bit higher than the data in the sixth register which is read according to the data in the fifth register before updated, in that case, the objective of the disclosure can also be realized.

Figure 2:
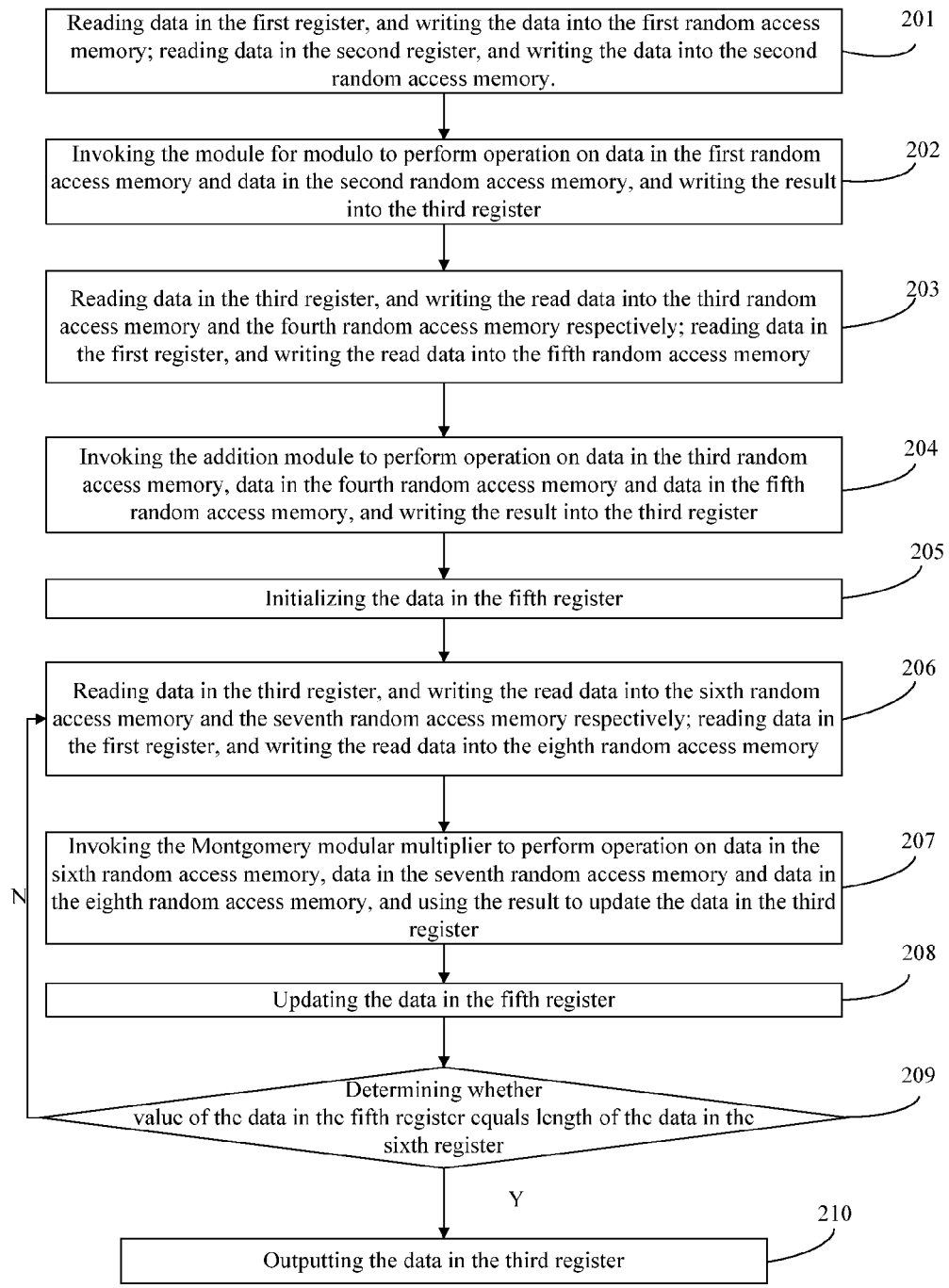
FIG. 2 is a flowchart of a method for realizing pre-computation for a large number in an embedded system according to embodiment 2 of the present disclosure.

FIG. 2 illustrates a flowchart of a method for realizing pre-computation for a large number in an embedded system according to embodiment 2 of the disclosure, in this embodiment, the length, stored in the sixth register, is n which is equal to $2^k$, and the method for realizing pre-computation for a large number includes step 201 to step 210.

In step 201, data in a first register is read, and the data which is read is written into a first random access memory; data in a second register is read, and the data which is read is written into a second random access memory.

In step 202, the module for modulo is invoked to perform an operation on the data in the first random access memory and the data in the second random access memory, and the result which is obtained from the operation is written into a third register.

In the embodiment, after invoking module for modulo to perform the operation, the data in the third register is recorded as W which is equal to R mod N.

In step 203, data in the third register is read, and the data which is read is written into a third random access memory and a fourth random access memory respectively; reading data in the first register, and the data which is read is written into a fifth random access memory.

In step 204, a modulo addition module is invoked to perform an operation on the data in the third random access memory, the data in the fourth random access memory and data in the fifth random access memory, and a result which is obtained from the operation is written into the third register.

In the embodiment, after the modulo addition module is invoked to perform the operation, the result (R mod N)+(R mod N) mod N=2R mod N may be obtained, the data W in the third register may be updated with 2R mod N.

In step 205, data in the fifth register is initialized.

Preferably, in the embodiment, the data in the fifth register may be set as 0.

In step 206, the data in the third register is read, and the data which is read is written into the sixth random access memory and the seventh random access memory respectively; the data in the first register is read, and the data which is read is written into an eighth random access memory.

In step 207, a Montgomery modulo multiplier is invoked to perform an operation on the data in the sixth random access memory, the data in the seventh random access memory and the data in the eighth random access memory, and the data in the third register is updated with a result which is obtained from the operation.

In the embodiment, data W in the third register, data W in the third register and data N in the first register are set as three input parameters of Montgomery modulo multiplier, and the modulo multiplication are performed on the data to obtain MontMul (W, W, N)=W*W*R$^{-1}$ mod N, the result which is get from modulo multiplication is stored into the third register, data W in the third register is updated with W*W*R$^{-1}$ mod N.

In step 208, the data in the fifth register is updated.

Specifically, the data in the fifth register is increased by 1, and the result which is obtained is made as the updated data in the fifth register.

In step 209, whether a value of the data in the fifth register is equal to a length of data in the sixth register is determined, step 210 is executed if value of the data in the fifth register is equal to the length of the data in the sixth register; step 206 is returned to if value of the data in the fifth register is not equal to the length of the data in the sixth register.

In step 210, the data in the third register is output.

In the case that the length is $2^k$, by applying the technical solution of the disclosure, the result from pre-computation for a large number may be obtained via performing iterative operation by the Montgomery modulo multiplier, thereby the speed of data processing is improved.

It's important to note that in other embodiments of the disclosure, the data in the fifth register may also be initialized as 1, and after step 206 to step 207 are executed, step 209 is executed, which is determining whether the value of the data in the fifth register is equal to the length of the data in the sixth register is determined, the data in the third register is output if the value of the data in the fifth register is equal to the length of the data in the sixth register; the data in the fifth register is increased 1, and the result is made as the updated data in the fifth register if the value of the data in the fifth register is not equal to the length of the data in the sixth register, and step 206 to step 207 are executed, and then step 209 is executed, circulating successively, the objective of the disclosure may also be realized.

Figure 3:
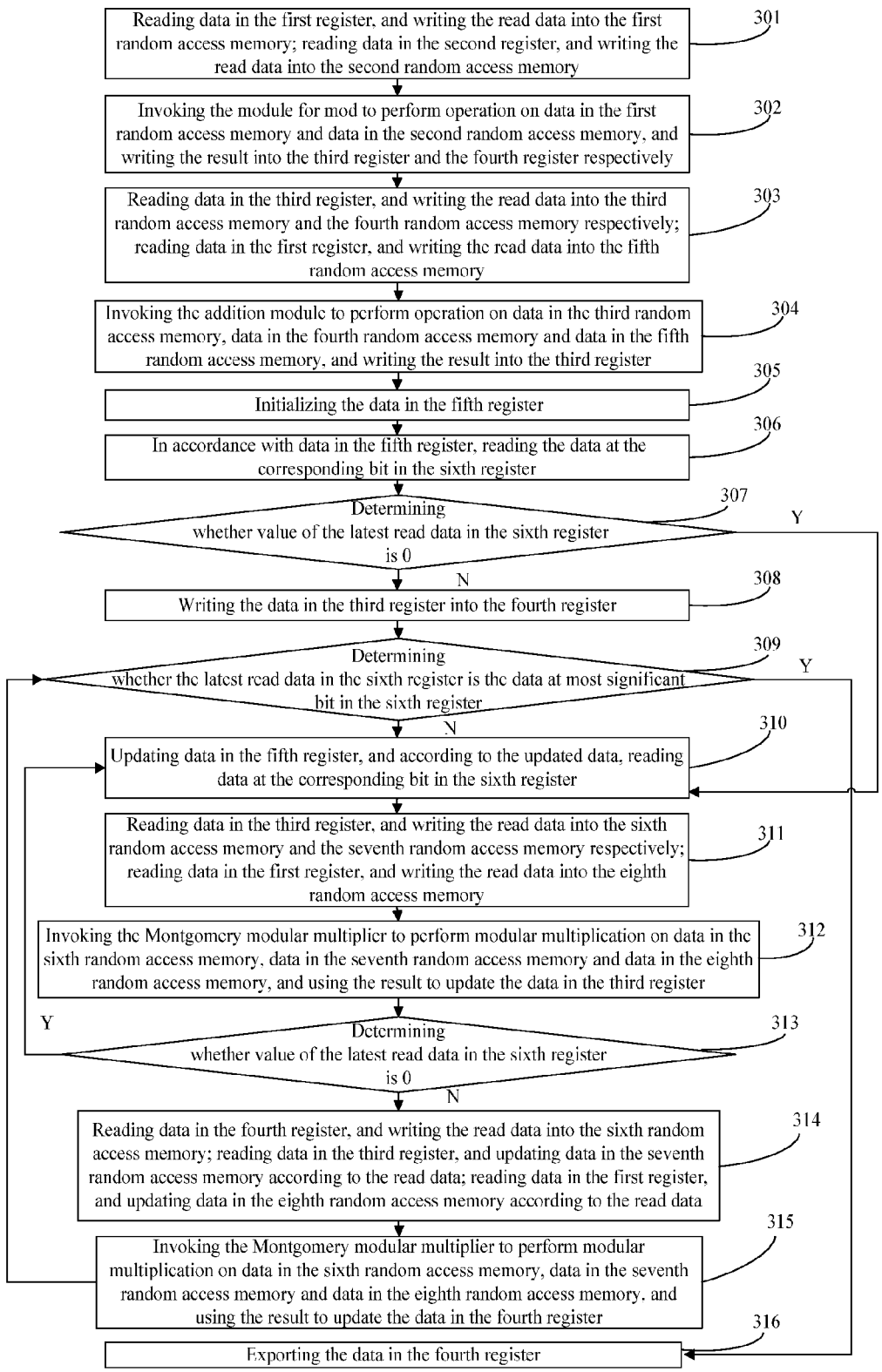
FIG. 3 is a flow chart of a method for realizing pre-computation for a large number in an embedded system according to embodiment 3 of the present disclosure.

FIG. 3 shows a flowchart of a method for realizing pre-computation for a large number according to embodiment 3 of the disclosure, including step 301 to step 316.

In step 301, data in a first register is read, and the data which is read is written into a first random access memory; data in a second register is read, and the data which is read is written into a second random access memory.

In step 302, a module for modulo is invoked to perform an operation on the data in the first random access memory and the data in the second random access memory, and a result which is obtained from the operation is written into a third register and a fourth register respectively.

In the embodiment, after invoking the module for modulo to perform operation, the data in the third register is recorded as W, the data in the fourth register is recorded as S, and S equal to W and equal to R mod N.

In step 303, the data in the third register is read, and the data which is read is written into a third random access memory and a fourth random access memory respectively; the data in the first register is read, and the read data is written into a fifth random access memory.

In step 304, after an modulo addition module is invoked to perform an operation on the data in the third random access memory, the data in the fourth random access memory and the data in the fifth random access memory, and a result which is obtained from the operation is written into the third register.

In the embodiment, after the modulo addition module is invoked to perform the operation, the result (R mod N)+(R mod N) mod N=2R mod N may be obtained, the data W in the third register may be updated with 2R mod N.

In step 305, data in a fifth register is initialized.

Preferably, in the embodiment, the data in the fifth register may be set as 0.

In step 306, in accordance with the data in the fifth register, the data at the corresponding bit in a sixth register is read.

In accordance with value of the data in the fifth register, a position where the data is to be read in the sixth register is determined, and corresponding data in the sixth register is read according to the position.

Preferably, in the embodiment, making the data in the fifth register as orders of data which need to be read in the sixth register, and reading the data of one-bit in the sixth register, wherein, the order is a serial number of data of each bit in the sixth register.

For instance, in the case that the data, in the sixth register, is n, and $n=n_k*2^k+n_{k-1}*2^{k-1}+\ldots+n_i*2^i+\ldots+n_1*2^1+n_0*2^0$ ($n_i$=1 or 0), the data is $(n_k n_{k-1} \ldots n_i \ldots n_1 n_0)_2$ in a case that being converted into the binary system, the bit orders of $n_k$, $n_{k-1}$, $n_i$, $n_1$ and $n_0$ is k, k−1, i, 1 and 0 respectively. In the case that the data in the fifth register is 0, the data which is read at the corresponding bit according to the data in the fifth register is $n_0$ at the least significant bit. In the case that the data in the fifth register is k, the data which is read at the corresponding bit is $n_k$ at the most significant bit.

In step 307, whether a value of the latest read data in the sixth register is 0 is determined, step 310 is executed if the value of the latest read data in the sixth register is 0, step 308 is executed if the value of the latest read data in the sixth register is not 0.

In step 308, the data in the third register is written into the fourth register.

In step 309, whether the latest read data in the sixth register is the data at most significant bit in the sixth register is determined, step 316 is executed if the latest read data in the sixth register is the data at most significant bit in the sixth register; step 310 is executed if the latest read data in the sixth register is not the data at most significant bit in the sixth register.

In step 310, the data in the fifth register is updated, and according to the updated data, data at the corresponding bit in the sixth register is read.

Specifically, the data in the fifth register is increased by 1, and the result is made as the updated data in the fifth register.

In step 311, the data in the third register is read, and the data which is read is written into a sixth random access memory and a seventh random access memory respectively; the data in the first register is read, and the data which is read is written into an eighth random access memory.

In step 312, the Montgomery modulo multiplier is invoked to perform modulo multiplication on the data in the sixth random access memory, the data in the seventh random access memory and the data in the eighth random access memory, and the data in the third register is updated with a result which is obtained from the modulo multiplication.

In the embodiment, data W in the third register, data W in the third register and data N in the first register are respectively set as three input parameters of the Montgomery modulo multiplier, modulo multiplication is performed on the data to obtain MontMul(W, W, N)=W*W*R$^{-1}$ mod N, and storing the result in the third register, and then data W in the third register is updated with W*W*R$^{-1}$ mod N.

In step 313, whether the value of the latest read data in the sixth register is 0 is determined, step 310 is returned to if the value of the latest read data in the sixth register is 0, step 314 is executed if the value of the latest read data in the sixth register is not 0.

In step 314, the data in the fourth register is read, and the data which is read is written into the sixth random access memory; the data in the third register is read, and the data in the seventh random access memory is updated according to the read data; the data in the first register is read, and the data in the eighth random access memory is updated according to the read data.

In step 315, the Montgomery modulo multiplier is invoked to perform modulo multiplication on the data in the sixth random access memory, the data in the seventh random access memory and the data in the eighth random access memory, and the data in the fourth register is updated with a result which is obtained from the modulo multiplication, and step 309 is returned to.

In the embodiment, data S in the fourth register, data W in the third register and data N in the first register are respectively set as three input parameters of the Montgomery modulo multiplier, modulo multiplication is performed on the data to obtain MontMul (S, W, N)=$S*W*R^{-1}$ mod N, the result is stored into the fourth register, and data S in the fourth register is updated with $S*W*R^{-1}$ mod N.

In step 316, the data in the fourth register is output.

In the case that the length is any value, by applying the technical solution of the disclosure, the result from large numbers pre-computation may be obtained via performing iterative operation by the Montgomery modulo multiplier according to the value at each bit of binary numbers which is corresponding to length, thereby the speed of data processing is improved.

It's important to note that in other embodiments of the disclosure, the data in the fifth register can be initialized as any value beside 0, and the value is corresponding to the position of the data at the least significant bit in the sixth register; when being updated, the data in the fifth register may be increased by any value beside 1, and then the data in the sixth register is read in accordance with the updated data in the fifth register, the read data in the sixth register is one-bit higher than the data in the sixth register which is read according to the data in the fifth register before updated, in that case, the objective of the disclosure may also be realized.

Figure 4:
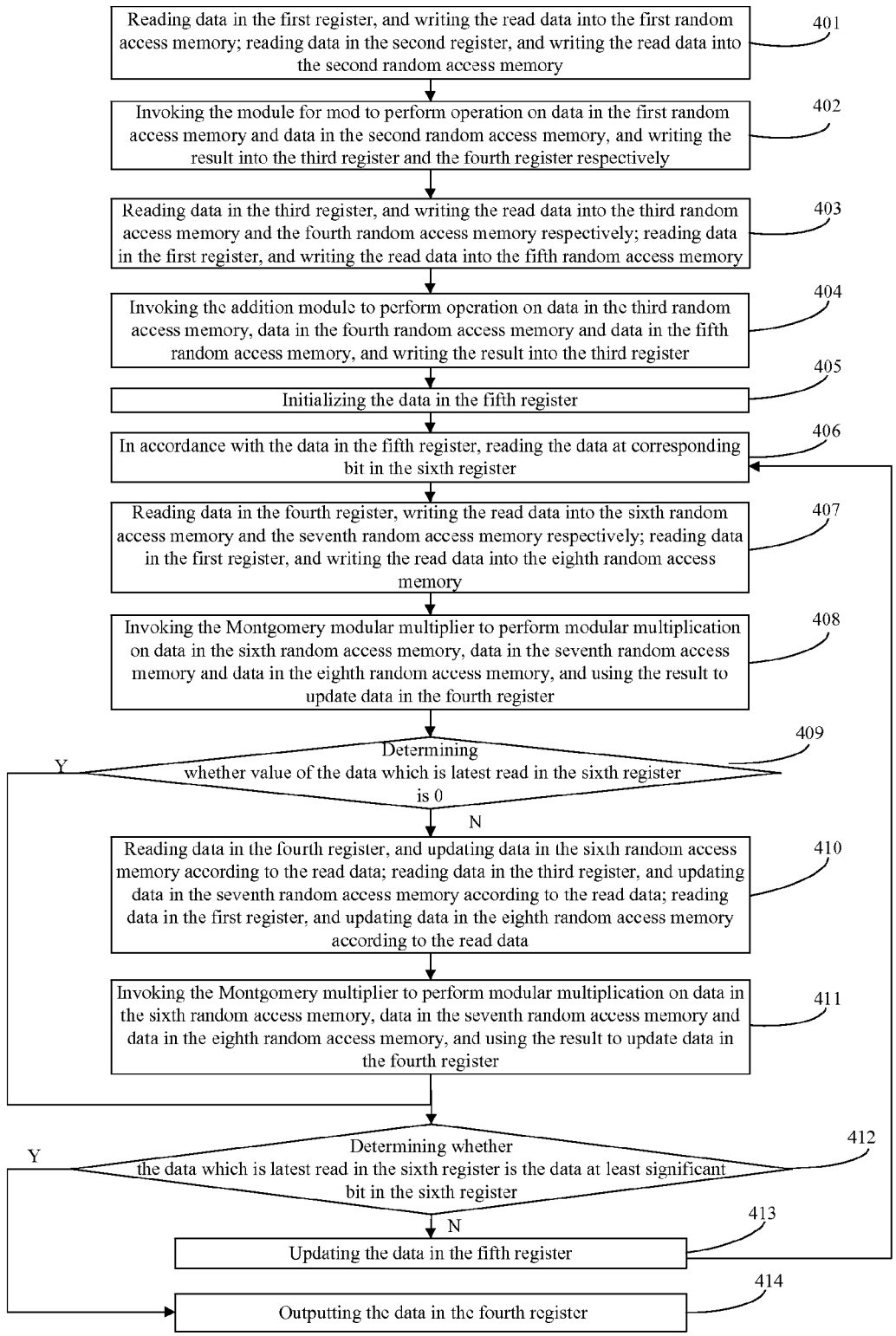
FIG. 4 is a flow chart of a method for realizing pre-computation for a large number in an embedded system according to embodiment 4 of the present disclosure.

FIG. 4 illustrates a flowchart of a method for realizing pre-computation for a large number in an embedded system according to embodiment 4 of the disclosure, including step 401 to step 214.

In step 401, data in a first register is read, and the data which is read is written into a first random access memory; data in a second register is read, and the data which is read is written into a second random access memory.

In step 402, the module for modulo is invoked to perform an operation on the data in the first random access memory and the data in the second random access memory, and a result which is obtained from the operation is written into a third register and a fourth register respectively.

In the embodiment, after the module for modulo is invoked to perform the operation, the data in the third register is set as W, the data in the fourth register is set as S, and S is equal to W and is equal to R mod N. For instance:

N is
0xD99E413375024660171E3AB08CA00A3E1AA4985B
EAAF8AC09F892DA9C61915945C7B4D72849EC1CD74
7586AB780D0B171FD8C27A5688A2E085AF6C50687A
E3E0997238134D7DA34B96B8B7C0C993B4F1DF3FF6
D46826460E13B0E8FAFA0BD59B2843627A4B8B253C
5873FA87720D28DC3021A1898CF7DE8B4BC7525086
CBFFE7CD1176663EC8EE958D59C94D60010E2F6063
D5108049931454D00985B478064C2607DEB977D973C7
750A19B2BC65DA102DD0A371;

R is
0x1000000000000000000000000000000000000000000
0000000000000000000000000000000000000000000
0000000000000000000000000000000000000000000
0000000000000000000000000000000000000000000
0000000000000000000000000000000000000000000
0000000000000000000000000000000000000000000
0000000000000000000000000000000000000000000
000000000000000000000000000, and the value of W which is equal to S is
0x2661BECC8AFDB99FE8E1C54F735FF5C1E55B67A4
1550753F6076D25639E6EA6BA384B28D7B613E328B
8A795487F2F4E8E0273D85A9775D1F7A5093AF97851C
1F668DC7ECB2825CB46947483F366C4B0E20C0092B
97D9B9F1EC4F170505F42A64D7BC9D85B474DAC3A7
8CO5788DF2D723CFDE5E76730821 74B438ADAF7934
001832EE8999C137116A72A636B29FFEF1D09F9C2A
EF7FB66CEBAB2FF67A4B87F9B3D9F8214688268C38
8AF5E64D439A25EFD22F5C8F.

In step 403, reading the data in the third register, and writing the data which is read into a third random access memory and a fourth random access memory respectively; reading the data in the first register, and writing the data which is read into a fifth random access memory.

In step 404, invoking a modulo addition module to perform an operation on the data in the third random access memory, the data in the fourth random access memory and the data in the fifth random access memory, and writing a result which is obtained from the operation into the third register.

In the embodiment, the modulo addition module is invoked to perform the operation to get the result (R mod N)+(R mod N) mod N=2R mod N, and data W in the third register is updated with 2R mod N.

In the embodiment, the value of updated data W in the third register is
0x4CC37D9915FB733FD1C38A9EE6BFEB83CAB6CF48
2AA0EA7EC0EDA4AC73CDD4D74709651AF6C27C65
1714F2A90FE5E9D1C04E7B0B52EEBA3EF4A1275F2F
0A383ECD1B8FD96504B968D28E907E6CD8961C4180
12572FB373E3D89E2E0A0BE854C9AF793B0B68E9B5
874F180AF11BE5AE479FBCBCECE61042E968715B5E
F268003065DD1333826E22D4E54C6D653FFDE3A13F
3855DEFF6CD9D7565FECF4970FF367B3F0428D104D
187115EBCC9A87344BDFA45EB91E.

In step 405, the data in a fifth register is initialized.

Preferably, in the embodiment, the data in the fifth register can be set equal to the length of the data in a sixth register.

In step 406, in accordance with the data in the fifth register, the data at a corresponding bit in the sixth register is read.

The position where the data is to be read in the sixth register is determined according to the value of the data in the fifth register, and the data at the corresponding bit in the sixth register is read according the position. Preferably, in the embodiment, order of the bits of the data which need to be read in the sixth register may be obtained according to the data in the fifth register, and the data of 1 bit may be read from the sixth register in accordance with the order of the bits which is serial number of the position of the data at each bit in the sixth register.

For instance, in the case that the data, in the sixth register, is n, and $n = n_k*2^k + n_{k-1}*2^{k-1} + \ldots + n_i*2^i + \ldots + n_1*2^1 + n_0*2^0$ ($n_i$=1 or 0), the data is $(n_k n_{k-1} \ldots n_i \ldots n_1 n_0)_2$ in a case that being converted into the binary system, where, the bit orders of $n_k$, $n_{k-1}$, $n_i$, $n_1$ and $n_0$ is k, k−1, i, 1 and 0 respectively. In the case that the data in the fifth register is 1, the data which is read at the corresponding bit according to the data in the fifth register is $n_0$ at the least significant bit, In the case that the data in the fifth register is k+1, the data which is read at the corresponding bit is $n_k$ at the most significant bit.

In the embodiment, in the case that the value of the data n in the sixth register is 1440, and its binary format is (101 1010 0000)$_2$, after being initialized, the data in the fifth register is 11, and the data which is firstly read is 1.

In step 407, the data in the fourth register is read, the data which is read is written into a sixth random access memory and a seventh random access memory respectively; the data in the first register is read, and the data which is read is written into an eighth random access memory.

In step 408, the Montgomery modulo multiplier is invoked to perform modulo multiplication on the data in the sixth random access memory, the data in the seventh random access memory and the data in the eighth random access memory, and the data in the fourth register is updated with a result which is obtained from the modulo multiplication.

In the embodiment, data S in the fourth register, data S in the fourth register and data N in the first register are set as three input parameters of the Montgomery modulo multiplier, and modulo multiplication is performed on the data to obtain a result MontMul (S, S, N)=S*S*R$^{-1}$ mod N, the result is stored into the fourth register, and then the data S in the fourth register may be updated with S*S*R$^{-1}$ mod N.

For instance, in the case that the data which is read is $n_{10}$, the updated data in the fourth register is
0x2661BECC8AFDB99FE8E1C54F735FF5C1E55B67A4
1550753F6076D25639E6EA6BA384B28D7B613E328B
8A795487F2F4E8E0273D85A9775D1F7A5093AF97851C
1F668DC7ECB2825CB46947483F366C4B0E20C0092B
97D9B9F1EC4F170505F42A64D7BC9D85B474DAC3A7
8CO5788DF2D723CFDE5E7673082174B438ADAF7934
001832EE8999C137116A72A636B29FFEF1D09F9C2A
EF7FB66CEBAB2FF67A4B87F9B3D9F8214688268C38
8AF5E64D439A25EFD22F5C8F.

In the case that the data which is read is $n_9$, the updated data S in the fourth register is
0x9986FB322BF6E67FA387153DCD7FD707956D9E9055
41D4FD81DB4958E79BA9AE8E12CA35ED84F8CA2E
29E5521FCBD3A3809CF616A5DD747DE9424EBE5E14
707D9A371FB2CA0972D1A51D20FCD9B12C38830024
AE5F66E7C7B13C5C1417D0A9935EF27616D1D36B0E
9E3015E237CB5C8F3F7979D9CC2085D2D0E2B6BDE4
D00060CBBA266704DC45A9CA98DACA7FFBC7427E
70ABBDFED9B3AEACBFD9E92E1FE6CF67E0851A20
9A30E22BD799350E6897BF48BD723C.

In the case that the data which is read is $n_8$, the updated data S in the fourth register is
0xB2DF6A61C5D70D3E5FDFDF961CBF47A2206D4989
7FA83E74C85ACA10123C7B917F548DF2ACD65F8DCF
BC87F18F15385FC2C25365EA648C3699AA6258A75B
FA3535F80EA48D2A84AF67031471D39D46FE4D80A5
10AD4F13029D8F9E5A6B2AFB172B431366B03761C1
C7D86279FB1320849DA2A45416925A34ABFC365685
A801B394C5ACCF95DF397C0FAFD88F3FED00AB38
FB04D6FAD3A892095F54994F8F8EA5537256F592B5
DBF9C54A316EC0D6AADCC754820E.

In the case that the data which is read is $n_7$, the updated data S in the fourth register is
0x83B559FDB14D041345D3F9AA9F4FD3EAB1E36FB4
3E676E11AED53D885206823D0C17C168455885B84742
A18F62A7D73E388D58A10561F80B42F695D49E0843
AE52D045378D1C007F233FC94BF550FE72072B21062B
FE85CB63F843A000576246A314D8D4B594E02FFE89
BAFB9A1BD46DA1D44515023D58DF9A90DD460890
71CF89DF2720B6FDE8A335B940187B09492EAA79EE
64A5F844611D93372B3B8261DD22FC7FB8554B79ED
8C7F2361F0FA6BE886BF508C.

In the case that the data which is read is $n_6$, the updated data S in the fourth register is
0x022679CABF39B7DD61E056533B7B7BBA371BE1D0
DD007BA47277561B1B3BD915EE138C634B04CFE96C
05DFBAF7257E9B7186D1AA2A5F7800DBA36B3CC6
36393F1B4675E65C67A93B75D95B751291EE41D5A92F
E35DBC53EED619E9AA1D8AF0B66906AD17C5956C
8C1098B4084FD82DE72EA60D27C149F2C63EAE46BF
B5A9E2F326588355E2CBD927CB8D336BEA5A8DE138
2A0F953BCECFF7E8E67DF98FD8D6CB81C5BF5524E6
B051956745414873E5C04DAA0CC1.

In the case that the data which is read is $n_5$, the updated data S in the fourth register is
0x1ABC6003530F5BF6FAF99131099398E735CDBFA9
7E81E5F22AE25E2C1091FE972F4CC10E0514303E4C60
02288744F614BB2E727D0016A4D06BD6843BF9039D13
FA9904FD47457D3A7530BE02241C2579E9A404682790
478E9E720BF409B96F2908FEC6ED58AC08CD4A39A6
AF9F60CB234564F25341D7DCD9D7A375FA6328E3B6
3674F26A00F258357F69A4594D719CB34365D05376F3
722D1F1E64A17C04F1B30334381D94E9CB91B929D1
4D9739074A2BA45E5C.

In the case that the data which is read is $n_4$, the updated data S in the fourth register is
0x8A7128F0EF38233D76C6D8AFBA66D0C2473B5F68
9344E19E7DEA9CEB7DCBAC9B5C7BDB9075052C77
595E892754BD98B6E437FC212FF564D33A51F952230B
997C066C0165712821EC0CD43B3063D4D331293B80E3
7D9FE28D447D29D510C40417796EEBF09DCE402409
69D87E9B29608CE9479B72F989D02884CF0B54D286
1DD96FC66FB6C52974CAB7288CB5CF927BDD4A70
C5AA27F3E1BB2BF491D6C3C67FEF1C2F5716539F56
9535F1E601A4C90ED5E3D38EA5.

In the case that the data which is read is $n_3$, the updated data S in the fourth register is
0x531BC239F295E4934C5AF1EF888563C5F0DA69A5
B3F228983F89EDC6E3426D11944D372E299D28020D
D9B0F0E613A3E90821CD5D81D1C8A21B6915F0A027
4A73DCAB3E080D16581C3ACA2D604EAF0A347348
D29B40B756A8196CFBBA737F2F2C1C7CE95D75C8
AE953DBCB0FEAC60E7A71857074D41C4BBFC0F5528
115CAAB9877292A206A97553F0AC735212B838582037
54DF69D1042C07C888D30CBA570898D37F0C0565AD
F0C7E16C9EA6411774CBCB39FDCA.

In the case that the data which is read is $n_2$, the updated data S in the fourth register is
0x0871B99B9478368B4A9AD8631C3E72E08A91D37611
FD998D0517BF8757E0E5DA896A8AB60E53B8814CA9
F38FE671FBC903059E4E37450546CAF563F65A7B644F
DA8A206C8944157534F62E8D6AA548B138069FCD73
89569C4D721BD7B9395A3379E0D41709DF4ED1BA93
B8F2461B57D530959E69CE9B8591EF27CF0D5BA1BD
1F8D446C8685F1DE91649351CFB0CEEC751E76F59A
1E8CE702D4DFD9E20A8A263C7F36F4985A1BC08236
CAF0CCFE95893670D5D406.

In the case that the data which is read is $n_1$, the updated data S in the fourth register is
0x07010678BB199C55EA69B55807F60458299B2374A9
137F6E61DE2749010B02232A67B08843C0F24CF14686
3C8457D7AF3508301D6A74686D0402C8E4F4E99DD4C
63FD9BF70CE8773E0919B98891080EB666B21621792B
D0D02356A816CD6BCEE83F15C2AE86B08A081C35C3

D6F14631BD80A061BC212B398BC0CE83A6A2F202B0
898C2564AA9AF159E236F787B8747D31A82C5979E695
34CF0BAF78F9A99A1AF99D82BC6922BF77D87F4C0E
55E3793A2CC29E0C14.

In the case that the data which is read is $n_9$, the updated data S in the fourth register is
0xB83C9F28C1E3054ABC74607F8D0E9BF7749570117F
35B79B891169D963F693E928F26FC3422F7EB469E436
0872C2C1122A27EA331D8EA13B559CF48F5F60573F
DCAAAA8F83103CD6A5FF4E6AB3B6F6A4C2C073CE
BC2E12EEC89CF8FB0CD4EF713C354FE5C3D7E60E
5D2DA4D7C82D181B4B1DEF3DE585A616398CACE9
90EBDAF23C441DD72D89D1A295163B6337F5AFB59F
A35E77FA7EDF391F257220D0D5BB61395D26826690
AD1297D714B5D114A2CBD0A814E7.

In step 409, whether a value of the data which is latest read in the sixth register is 0 is determined, step 412 is executed if the value of the data which is latest read in the sixth register is 0, step 410 is executed if the value of the data which is latest read in the sixth register is not 0.

In step 410, the data in the fourth register is read, and the data in the sixth random access memory is updated according to the data which is read; reading the data in the third register, and the data in the seventh random access memory is updated according to the data which is read; the data in the first register is read, and the data in the eighth random access memory is updated according to the data which is read.

In step 411, the Montgomery modulo multiplier is invoked to perform modulo multiplication on the data in the sixth random access memory, the data in the seventh random access memory and the data in the eighth random access memory, and the data in the fourth register is updated with a result which is obtained from the modulo multiplication.

In the embodiment, data S in the fourth register, data W in the third register and data N in the first register are respectively set as three input parameters of the Montgomery modulo multiplier, modulo multiplication is performed on the data to obtain the result MontMul (S, W, N)=$S*W*R^{-1}$ mod N, and the result is stored into the fourth register, and then data S in the fourth register is updated with $S*W*R^{-1}$ mod N.

In the case that the data which is read is $N_{10}$ whose value is 1, the updated data S in the fourth register is
0x4CC37D9915FB733FD1C38A9EE6BFEB83CAB6CF48
2AA0EA7EC0EDA4AC73CDD4D74709651AF6C27C65
1714F2A90FE5E9D1C04E7B0B52EEBA3EF4A1275F2F
0A383ECD1B8FD96504B968D28E907E6CD8961C4180
12572FB373E3D89E2E0A0BE854C9AF793B0B68E9B5
874F180AF11BE5AE479FBCBCECE61042E968715B5E
F268003065DD1333826E22D4E54C6D653FFDE3A13F
3855DEFF6CD9D7565FECF4970FF367B3F0428D104D
187115EBCC9A87344BDFA45EB91E.

In the case that the data which is read is $n_8$ whose value is 1, the updated data S in the fourth register is
0x8C20939016ABD41CA8A1847BACDE85062635FAB7
14A0F228F12C66765E5FE18EA22DCE72D50DFD4E2B
038937A61D65A865ABE4517E40758CADA55860E63D
1089D27DE535CCD76613374D7122DDA6D90ABBC153
4CF277DFF7276E53B9DC4A20932E42C45314E39E4737
3CCA6C8419182D0B23A71EA02CD5DE0C311A5C8484
037F5C79E338ECF584629205E7D11FD8F3271192349D
755DBE0FBDEE9FACEAA716FE80DCCF31AD92442C
158A492AC5477BA960D860AB.

In the case that the data which is read is $n_7$ whose value is 1, the updated data S in the fourth register is
0x2DCC72C7ED97C1C67489B8A4B1FF9D974922470C
921F5162BE214D66DDF3EEE5BBB4355E061249A31A
0FBC734D42A3655141EEC7B43B4D36003DBF58D395
A37C0C2E525BCCBA5DB2AFC6DAD7210E47F22F16
4B37EFD6C588B43F9E4506A2EEF21DE64F2F1F9E9B
23A49F7B6FC22A7FFF1386E8A07782D333E95A683B
8A54E3B746ACD7DB2F32E2B0DE18B6E39611842DF4
9007B8CBA6F5ADE65664D0C28CBD6E1FF120B732
BD8013A3F42D11258EFDC0DFADFDA7.

In the case that the data which is read is $n_5$ whose value is 1, the updated data S in the fourth register is
0x3578C006A61EB7EDF5F322621327310E6B9B7F52FD
03CBE455C4BC582123FD2E5E99839C0A28607C98C0
04510E89EC29765CE4FA002D49A0D7AD0877F2073A
27F53209FA8E8AFA74EA617C0448384AF3D34808D0
4F208F1D3CE417E81372DE5211FD8DDAB158119A94
734D5F3EC196468AC9E4A683AFB9B3AF46EBF4C651
C76C6CE9E4D401E4B06AFED348B29AE3396686CBA0
A6EDE6E45A3E3CC942F809E3660668703B29D3972372
53A29B2E720E945748BCB8.

It's important to note that after step 411 is executed, step 412 is executed.

In step 412, whether the data which is latest read in the sixth register is the data at the least significant bit in the sixth register is determined, step 414 is executed if the data which is latest read in the sixth register is the data at the least significant bit in the sixth register; step 413 is executed if the data which is latest read in the sixth register is not the data at the least significant bit in the sixth register.

In step 413, the data in the fifth register is updated, and step 407 is returned to.

Specifically, the data in the fifth register may be decreased by 1, and then making the result as updated data in the fifth register.

In step 414, the data in the fourth register is output.

In the case that the length is any value, by applying the technical solution of the disclosure, the result from large numbers pre-computation may be obtained via performing iterative operation by the Montgomery modulo multiplier according to the value at each bit of binary numbers which is corresponding to length, thereby the speed of data processing is improved.

It's important to note that in other embodiments of the disclosure, the data in the fifth register can be initialized as any value beside the length of the data in the sixth register, and the value is corresponding to the position of the data at the most significant bit in the sixth register; when being updated, the data in the fifth register may be decreased by any value beside 1, and then reading the data in the sixth register in accordance with the updated data in the fifth register, the read data in the sixth register is one-bit lower than the data in the sixth register which is read according to the data in the fifth register before being updated, and in that case, the objective of the disclosure may also be realized.

Steps described in the method according to embodiments of the disclosure can be implemented by hardware, software module executed by CPU, or combination of hardware and software module. The software module can be placed in random access memory (RAM), internal memory, read-only memory (ROM), electrically-programmable ROM, electrically-erasable programmable ROM, register, rigid disk, removable disc, CD-ROM, or other memory mediums which is known to all technicians in the technical field.

While all above are preferred embodiments of the present disclosure, protective scope of the disclosure is not limited to hereof, variations and changes which can be made by those skilled in the art easily fall in scope of the disclosure. It is intended that the following claims defined the scope of the disclosure and that method and structures within the scope of these claims and their equivalents be covered thereby.

The invention claimed is:

1. A method for realizing pre-computation for a large number in an embedded system, comprising:

SA1 comprising: reading data in a first register, and writing the data which is read into a first random access memory; reading data in a second register, and writing the data which is read into a second random access memory; wherein the first register is configured to store a first data, the second register is configured to store a second data, a sixth register is configured to store a third data, a relationship of the second data to the third data is defined as $R=2^n$, R represents the second data, n represents the third data, and the third data is an integer;

SA2 comprising: invoking a module for modulo to perform an operation on the data in the first random access memory and the data in the second random access memory, and writing a result which is obtained from the operation into a third register and a fourth register respectively; wherein the module for modulo is configured to perform modulo operation with the data in the second random access memory mod the data in the first random access memory;

SA3 comprising: reading data in the third register, and writing the data which is read into a third random access memory and a fourth random access memory respectively; reading data in the first register, and writing the data which is read into a fifth random access memory;

SA4 comprising: invoking a modulo addition module to perform an operation on the data in the third random access memory, the data in the fourth random access memory and the data in the fifth random access memory, and updating the data in the third register with a result which is obtained from the operation; wherein the modulo addition module is configured to perform modulo addition operation with the data in the third random access memory plus the data in the fourth random access memory to obtain a sum, and the sum mod the data in the fifth random access memory;

SA5 comprising: reading data at the least significant bit in the sixth register according to data in a fifth register, and making the data which is read as data at current bit, wherein an initial value of the data in the fifth register is a preset value;

SA6 comprising: determining a value of the data at the current bit, executing step SA7 if the value of the data at the current bit is 0; executing step SA10 if the value of the data at the current bit is 1;

SA7 comprising: reading data in the third register, and writing the data which is read into a sixth random access memory and a seventh random access memory respectively; reading data in the first register, and writing the data which is read into an eighth random access memory;

SA8 comprising: invoking a Montgomery modulo multiplier to perform modulo multiplication on the data in the sixth random access memory, the data in the seventh random access memory and the data in the eighth random access memory, and updating the data in the third register with a result which is obtained from the modulo multiplication; wherein the Montgomery modulo multiplier is configured to perform modulo multiplication on the data in the sixth random access memory, the data in the seventh random access memory and the data in the eighth random access memory as a first input parameter, a second input parameter and a third input parameter respectively;

SA9 comprising: updating data in the fifth register, and according to the updated data in the fifth register, reading data which is one-bit higher than the data at the current bit from the sixth register, and making the data which is read as updated data at the current bit, and returning to step SA6;

SA10 comprising: reading data in the fourth register, and updating the data in the sixth random access memory with the read data; reading data in the third register, and updating the data in the seventh random access memory with the read data; reading data in the first register, and updating the data in the eighth random access memory with the read data;

SA11 comprising: invoking a Montgomery modulo multiplier to perform modulo multiplication on the data in the sixth random access memory, the data in the seventh random access memory and the data in the eighth random access memory, and updating the data in the fourth register with a result which is obtained from the modulo multiplication;

SA12 comprising: determining whether data at the current bit is data at the most significant bit in the sixth register, executing step SA13 if the data at the current bit is the data at the most significant bit in the sixth register; returning to step SA7 if the data at the current bit is not the data at the most significant bit in the sixth register; and SA13 comprising: outputting the data in the fourth register.

2. The method according to claim 1, wherein updating data in the fifth register comprises:
increasing a preset step to the data in the fifth register, and making a result as the updated data in the fifth register.

3. The method according to claim 2, wherein:
the preset value is 1,
the preset step is 1, and
determining whether the data at the current bit is the data at the most significant bit in the sixth register comprises:
determining whether a value of the data in the fifth register is equal to a length of the data in the sixth register,
determining that the data at the current bit is the data at the most significant bit in the sixth register if the value of the data in the fifth register is equal to the length of the data in the sixth register, and
determining that the data at the current bit is not the data at the most significant bit in the sixth register if the value of the data in the fifth register is not equal to the length of the data in the sixth register.

4. A method for realizing pre-computation for a large number in an embedded system, comprising:

SC1 comprising: reading data in a first register, and writing the data which is read into a first random access memory; reading data in a second register, and writing the data which is read into a second random access memory;

SC2 comprising: invoking a module for modulo to perform an operation on the data in the first random access memory and the data in the second random access memory, and writing a result which is obtained from the operation into a third register and a fourth register respectively; wherein the module for modulo is configured to perform modulo operation with the data in the second random access memory mod the data in the first random access memory;

SC3 comprising: reading data in the third register, and writing the data which is read into a third random access memory and a fourth random access memory respectively; reading data in the first register, and writing the data which is read in to a fifth random access memory;

SC4 comprising: invoking a modulo addition module to perform an operation on the data in the third random access memory, the data in the fourth random access memory and the data in the fifth random access memory, and updating the data in the third register with a result which is obtained from the operation; wherein the modulo addition module is configured to perform modulo addition operation with the data in the third random access memory plus the data in the fourth random access memory to obtain a sum, and the sum mod the data in the fifth random access memory;

SC5 comprising: reading the updated data in the third register, writing the data which is read into a sixth random access memory and a seventh random access memory respectively; reading the data in the first register, and writing the data which is read into an eighth random access memory;

SC6 comprising: invoking a Montgomery modulo multiplier to perform modulo multiplication on the data in the sixth random access memory, the data in the seventh random access memory and the data in the eighth random access memory, and updating the data in the third register with a result which is obtained from the modulo multiplication; wherein the Montgomery modulo multiplier is configured to perform modulo multiplication with the data in the sixth random access memory, the data in the seventh random access memory and the data in the eighth random access memory as a first input parameter, a second input parameter and a third input parameter respectively;

SC7 comprising: updating data in a fifth register, and determining whether the data in the fifth register is equal to a length of data in a sixth register, executing step SC8 if the data in the fifth register is equal to the length of the data in the sixth register; returning to step SC5 if the data in the fifth register is not equal to the length of the data in the sixth register; and SC8 comprising: outputting the data in the third register.

5. The method according to claim 4, wherein updating data in the fifth register comprises:
adding 1 to data in the fifth register to obtain a result, and taking the result which is obtained as updated data in the fifth register.

6. The method according to claim 4, wherein before step SC7, the method further comprises:
initializing the data in the fifth register.

7. The method according to claim 6, wherein initializing the data in the fifth register comprises setting the data in the fifth register as 0.

8. The method according to claim 4, wherein:
the first register is configured to store a first data,
the second register is configured to store a second data,
a relationship of the second data to a third data is defined as $R=2^n$,
R represents the second data,
n represents the third data, and
the third data is an integer.

9. The method according to claim 8, wherein:
the sixth register is configured to store the third data,
$n=2^k$, and
k is an integer.

10. A method for realizing pre-computation for a large number in an embedded system, comprising:

SD1 comprising: reading data in a first register, and writing the data which is read into a first random access memory; reading data in a second register, and writing the data which is read into a second random access memory;

SD2 comprising: invoking a module for modulo to perform an operation on the data in the first random access memory and the data in the second random access memory, and writing a result which is obtained from the operation into a third register and a fourth register respectively; wherein the module for modulo is configured to perform modulo operation with the data in the second random access memory mod the data in the first random access memory;

SD3 comprising: reading data in the third register, and writing the data which is read into a third random access memory and a fourth random access memory respectively; reading data in the first register, and writing the data which is read into a fifth random access memory;

SD4 comprising: invoking an modulo addition module to perform an operation on the data in the third random access memory, the data in the fourth random access memory and the data in the fifth random access memory, and updating the data in the third register with a result which is obtained from the operation; wherein the modulo addition module is configured to perform modulo addition operation with the data in the third random access memory plus the data in the fourth random access memory to obtain a sum, and the sum mod the data in the fifth random access memory;

SD5 comprising: reading the updated data in the third register, and writing the data which is read into a sixth random access memory and a seventh random access memory respectively; reading the data in the first register, and writing the data which is read into an eighth random access memory;

SD6 comprising: invoking a Montgomery modulo multiplier to perform modulo multiplication on the data in the sixth random access memory, the data in the seventh random access memory and the data in the eighth random access memory, and updating the data in the third register with a result which is obtained from the modulo multiplication; wherein the Montgomery modulo multiplier is configured to perform modulo multiplication with the data in the sixth random access memory, the data in the seventh random access memory and the data in the eighth random access memory as a first input parameter, a second input parameter and a third input parameter respectively;

SD7 comprising: determining whether data in a fifth register is equal to a length of data in a sixth register, executing step SD9 if the data in the fifth register is equal to the length of the data in the sixth register; executing step SD8 if the data in the fifth register is not equal to the length of the data in the sixth register;

SD8 comprising: updating the data in the fifth register, and returning to step SD5; and SD9 comprising: outputting the data in the third register.

11. The method according to claim 10, wherein updating the data in the fifth register comprises:
adding 1 to data in the fifth register to obtain a result, and taking the result which is obtained as updated data in the fifth register.

12. The method according to claim 10, wherein before step SD7, the method further comprises:
initializing the data in the fifth register.

13. The method according to claim 12, wherein initializing the data in the fifth register comprises:
initializing the data in the fifth register as 1.

14. The method according to claim 10, wherein:
the first register is configured to store a first data,
the second register is configured to store a second data, and
a relationship of the second data to a third data is defined as $R=2^n$,
R represents the second data,
n represents the third data, and
the third data is an integer.

15. The method according to claim 14, wherein:
the sixth register is configured to store the third data,
$n=2^k$, and
k is an integer.

\* \* \* \* \*